(12) United States Patent
Pruett et al.

(10) Patent No.: US 8,335,653 B2
(45) Date of Patent: Dec. 18, 2012

(54) SYSTEM AND METHOD OF EVALUATING CROP MANAGEMENT

(75) Inventors: Michael A. Pruett, Mankato, MN (US); William E. Preller, Hudson, IL (US); Dale A. Simpson, Lascassas, TN (US)

(73) Assignee: CNH America LLC, Racine, WI (US)

(*) Notice: Subject to any disclaimer, the term of this patent is extended or adjusted under 35 U.S.C. 154(b) by 1411 days.

(21) Appl. No.: 11/381,033

(22) Filed: May 1, 2006

(65) Prior Publication Data

US 2007/0255502 A1    Nov. 1, 2007

(51) Int. Cl.
  *G01N 33/48* (2006.01)
  *G06G 7/48* (2006.01)
(52) U.S. Cl. ............................ 702/19; 703/11
(58) Field of Classification Search ............... None
   See application file for complete search history.

(56) References Cited

U.S. PATENT DOCUMENTS

| | | | |
|---|---|---|---|
| 4,992,942 A | 2/1991 | Bauerle et al. | |
| 5,897,619 A | 4/1999 | Hargrove, Jr. et al. | |
| 6,058,351 A | 5/2000 | McCauley | |
| 6,327,569 B1 | 12/2001 | Reep | |
| 6,778,872 B2 | 8/2004 | Jorgenson et al. | |
| 6,990,459 B2* | 1/2006 | Schneider | 705/8 |
| 2002/0023052 A1 | 2/2002 | Remley et al. | |
| 2002/0059091 A1 | 5/2002 | Hay et al. | |
| 2003/0036852 A1 | 2/2003 | Ell et al. | |
| 2008/0148432 A1* | 6/2008 | Abad | 800/279 |

OTHER PUBLICATIONS

Ruiz-Nogueira et al. (Agricultural Systems, 2001, 68, 151-173).*
Sutherland et al. (Annals of Botany, 1987, 59, 399-411).*
Alessi et al. (Agronomy Journal, 1974, 66, 316-319).*

* cited by examiner

*Primary Examiner* — Larry D Riggs, II
(74) *Attorney, Agent, or Firm* — Rebecca Henkel; Sue Watson

(57) ABSTRACT

A method of and system for evaluating performance of a plant population in an area of interest is provided. The method includes the steps of receiving input data from a user, the input data representative of at least one management parameter in the group consisting of: a total plant population in a selected sampling sub-area, a spacing of an individual plant relative to a nearest adjacent plant in the sampling sub-area, and a maturity of the individual plant relative to the nearest adjacent plant in the sampling sub-area. The system analyzes the input data in accordance with a mathematical model having an objective function for predicting a performance of a plant stand represented by a net effective plant population reduced from a benchmark plant population by deduction factors related to at least one of the management parameters.

10 Claims, 3 Drawing Sheets

SYSTEM AND METHOD OF EVALUATING CROP MANAGEMENT

RELATED APPLICATIONS

Not applicable.

BACKGROUND OF THE INVENTION

1. Field of the Invention

The invention relates to a system for and method of evaluating crop performance, and more specifically, relates to a system operable to evaluate performance on an individual plant basis.

2. Discussion of Related Art

Growers are continually pursuing strategies that will improve the yield and profit of their planted crops. In addition to assessing uncontrollable factors such as weather and markets, cropping strategies must also consider and understand controllable factors, such as field operations. The field operations can include the type of tillage, the spacing between plants, and the planting date of the crop. Careful planning and management decisions are critical for profitable growers. These crop management decisions can become quite complex for a grower or agronomist to make.

Unfortunately, there are few computer-based tools to help growers make these critical decisions. Although today's growers typically have access to powerful personal computers, there is a need for development of software as a tool for growers to make critical decisions in managing the planting of their crops. Known agricultural-related software typically only perform record-keeping and accounting functions. However, the algorithms employed in these certain known software are not utilized as a predictive tool for growers to make crop management decisions. Other known agricultural software as described in U.S. Pat. No. 6,990,459 and U.S. Pat. No. 6,998,877 are utilized to predict a profit using specific mathematical models dependent on a type of crop planted on a field. However, these certain known software tools are not are not capable of assisting growers as a predictive evaluation tool in making crop stand quality management decisions (e.g., soil bed preparation, planting spacing, planting date).

Therefore, there is a need by growers for system that overcomes the drawbacks described above. The system should also be simple so as used by growers or sales people with very little or no agronomic science background. The system should also be a reliable predictive tool in providing a difference in yield and profit associated with implementing different plant stand management strategies. In addition, the system should be configured to be utilized with management strategies to improve yield associated with growing a wide variety of crops (e.g., soybean, beets, etc.) or agricultural animals (e.g., sheep, pigs, chickens, etc.).

SUMMARY OF THE INVENTION

The present invention provides a method of and a system used for a predictive evaluation tool in making crop stand quality management decisions. The method and system of the invention provide a simple and reliable evaluation tool that can be utilized by growers or sales people with very little or no agronomic science background. The system also provides a tool to predictive a difference in yield and profit associated with implementing different plant stand management strategies. In addition, the method and system of the invention can be configured to be utilized with management strategies to improve yield associated with growing a wide variety of crops (e.g., soybean, beets, etc.) or agricultural animals (e.g., sheep, pigs, chickens, etc.).

One embodiment of the present invention provides a method for evaluating performance of a plant population in an area of interest. A method of and system for evaluating performance of a plant population in an area of interest is provided. The method includes the steps of receiving input data from a user, the input data representative of at least one management parameter in the group consisting of: a total plant population in a selected sampling sub-area, a spacing of an individual plant relative to a nearest adjacent plant in the sampling sub-area, and a maturity of the individual plant relative to the nearest adjacent plant in the sampling sub-area. The system analyzes the input data in accordance with a mathematical model having an objective function for predicting a performance of a plant stand represented by a net effective plant population reduced from a benchmark plant population by deduction factors related to at least one of the management parameters.

In a preferred embodiment, the mathematical model is expressed as the following representation:

$$\text{Net Effective Plant Pop.} = [(TP_i - \Sigma(n_{si}*s_i + n_{mi}*m_i))/TP_i] * (\text{Benchmark Plant Pop.})$$

wherein (i) represents an identifier of the sampling sub-area, ($TP_i$) represents a total number of plants in the sampling sub-area, ($n_{si}$) represents number of plants in sampling within a predetermined spacing of the nearest neighboring plant that differs from a benchmark spacing, ($s_i$) represents a predicted deduction factor in yield potential dependent on spacing, ($n_{mi}$) represents number of plants in the sampling sub-area within a predetermined maturity below a benchmark maturity, and ($m_i$) represents a predicted deduction factor in yield potential dependent on maturity. The method further includes the steps of calculating a predicted yield of the plant population equal to the net effective plant population multiplied by a benchmark yield per individual plant, and displaying the predicted yield to the user. The method further includes the steps of calculating a predicted yield loss equal to a difference between the predicted yield of the plant population and a benchmark yield for the plant population. The benchmark yield is equal to the benchmark plant population multiplied by the benchmark yield per individual plant. The predicted yield loss is displayed to the user. The method further includes receiving a crop market price data per yield of the plant, and calculating a cost of the yield loss equal to the crop market price data multiplied by the predicted yield loss, and displaying the cost of the yield loss to the user.

The method further includes the step of identifying a recommendation to reduce the predicted yield loss. In one embodiment, the step of identifying the recommendation includes identifying differences between the input data for benchmark maturity and a benchmark maturity of an individual plant relative to neighboring plants, calculating a predicted increase in profit dependent on a difference between a price of a benchmark yield dependent on the benchmark maturity and the price of the predicted yield, and displaying the increase in profit to the user. In another embodiment, the step of identifying the recommendation includes identifying differences between the spacing of the individual plants and a benchmark spacing for the individual plant, calculating a predicted profit based on a difference in the price of the predicted yield and a price of the benchmark yield at the benchmark spacing, and displaying the recommendation including the benchmark spacing and the predicted profit to the user.

The preferred method of the invention further includes the step of calculating a return on investment for a planting equipment, including the steps of receiving a input data representative of at least one of a historical spacing of individual plants relative to the benchmark spacing using the planting equipment, and a historical maturity of individual plants relative to the benchmark maturity using the planting equipment; receiving a capital cost of the planting equipment; calculating a net effective plant population using the mathematical model and the input data for at least one of the historical spacing and the historical maturity; calculating a predicted yield of the plant population and the predicted cost of the yield using the predicted net effective plant population; calculating the predicted return on investment dependent on the capital cost of the planting equipment and the predicted cost of the yield using the planting equipment; and displaying the predicted return on investment to the user.

A plant stand management evaluator system in accordance with the present invention is also provided. The system is in communication with an input and an output via a communications link. The system includes a computer including a processor in communication with a memory. The memory includes a plurality of computer program code instructions for execution by the processor. The plurality of computer program code instructions includes the steps of receiving input data from a user, the input data representative of one or more management parameters in the group consisting of: a total plant population in a selected sampling sub-area, a spacing of an individual plant relative to a nearest adjacent plant in the sampling sub-area, and a maturity of the individual plant relative to the nearest adjacent plant in the sampling sub-area. The steps further include analyzing the input data on a computer in accordance with a mathematical model having an objective function for predicting a yield of the area of interest dependent on an individual plant performance, and generating a display indicative of the predicted net effective plant population to the user.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
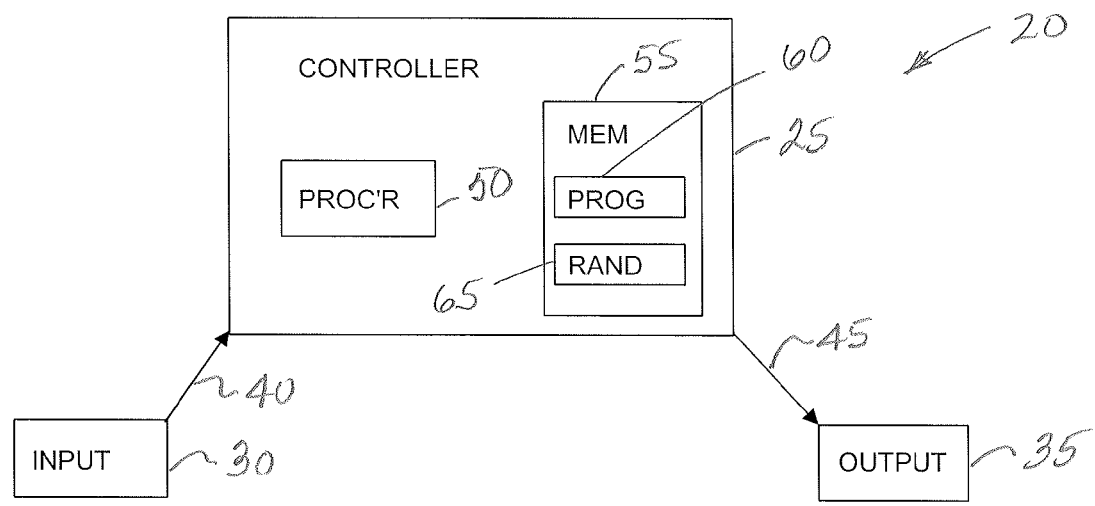
FIG. 1 illustrates a schematic diagram of a system of the present invention operable to predict a yield potential on an individual plant basis.

FIG. 1 illustrates a preferred embodiment of a crop management system 20 in accordance with the present invention. The crop management system 20 generally includes a controller 25 in communication with one or more inputs or input devices 30 capable of providing input data to the controller 25. The controller 25 is also in communication with one or more outputs or output devices 35 operable to provide a predictive tool to the user. Each input device 30 and output device 35 are configured to communicate with the controller via various types of communication links 40 and 45, respectively, including an internet connection, a wireless connection, a wire-connection, or other know medium of communication.

Still referring to FIG. 1, the controller 25 generally includes a processor 50 and a memory 55 configured to store a software program or program code instructions to be executed by the processor 50. The controller 25 is configured to output data to the output device 35 for display to an operator or user. The memory 55 further includes a program memory 60 to store the program code instructions, and a random storage memory 65 configured to store input data collected by the input device 30 described above. For example, the random storage memory 65 may store historical yield data, price data, soil data, and weather data input by users of the system 20 and/or third parties (e.g., equipment manufacturers, agronomists, soil surveyors, weather databases, etc.). The random memory 65 may be accessed by the processor 50 to execute the instructions of the stored program code as described later.

Figure 4:
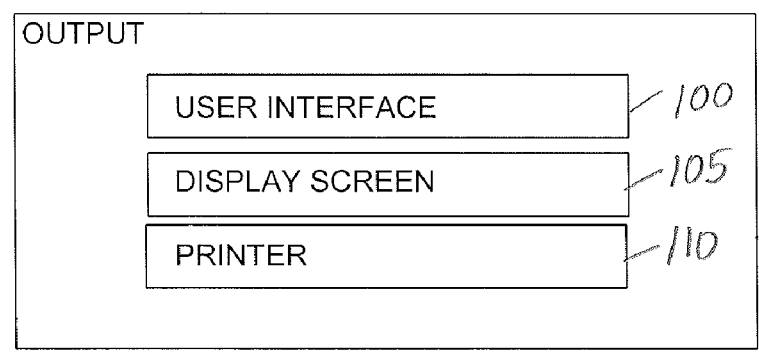
FIG. 4 illustrates a detailed schematic diagram of the output shown in FIG. 1.
Figure 5:
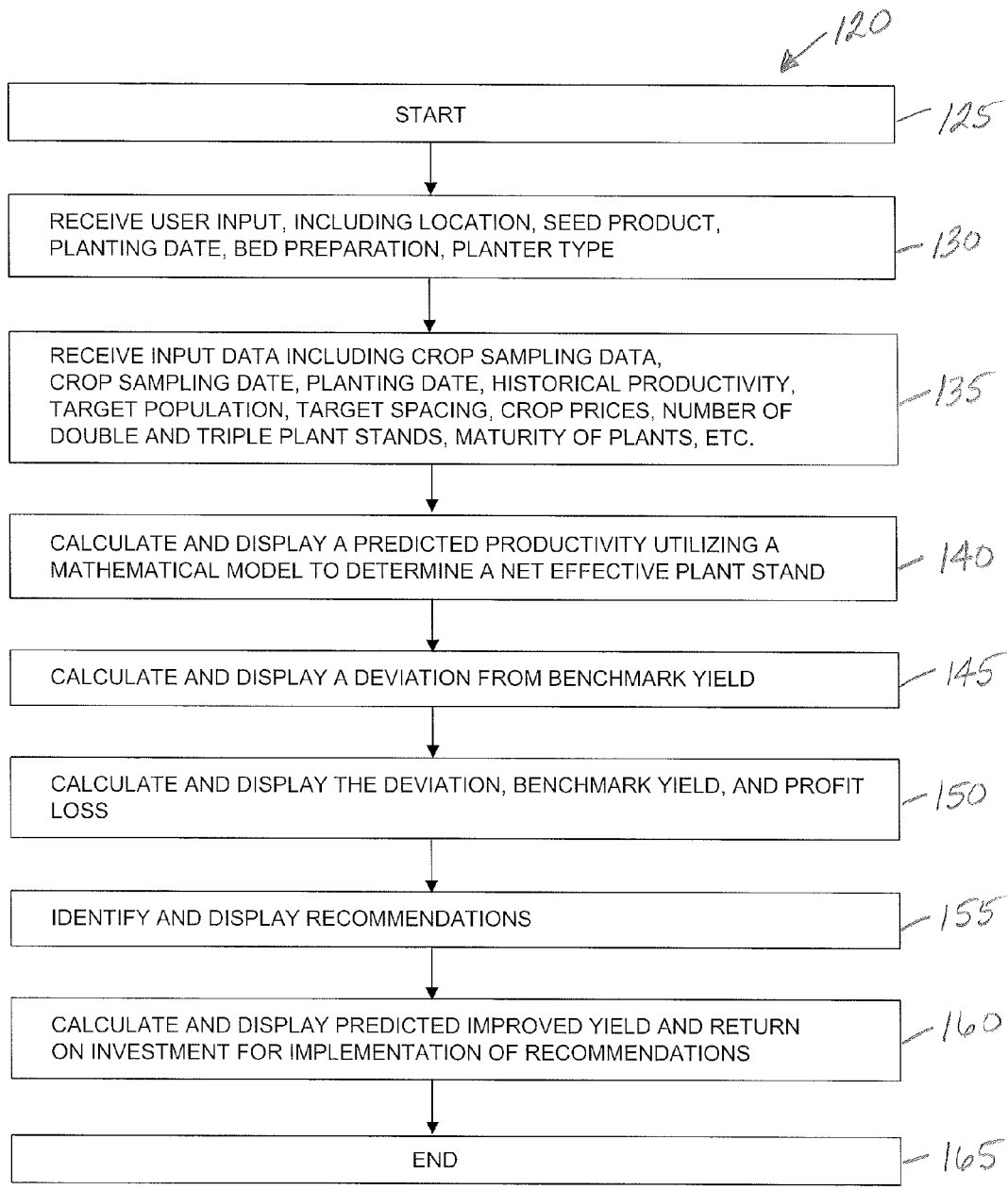
FIG. 5 illustrates a schematic flow diagram of a method of determining a yield potential of an individual plant using the system shown in FIG. 1.

Referring now to FIG. 4, the input device can include one or more of the following: a user interface 70, crop management sensor 75, weather sensor 80, location-determining transmitter (e.g., a global positioning system transmitter, etc.) 85, a soil sensor 90, and a productivity sensor (e.g., yield sensor) 95. The user interface 70 can include any device that allows a user to input data, including but not limited to a graphical user interface, a keyboard, a pointing device. The user-interface 70 can also be a programmable data assistant (PDA) device or other device employing a memory, a floppy disk drive, a magnetic storage medium, an optical storage medium or otherwise capable of downloading input data to the controller. The user interface 70 can also be a personal computer or computer terminal connected in communication via an internet connection or wireless connection to communicate input data to the controller 25. Accordingly, the user interface 70 can be generally used to input data that is gathered by growers, agronomists, equipment manufacturers, information service providers, soil surveyors, weather databases or other sources.

The soil sensor 90 can be any sensor capable of detecting at least one of the soil factors and sub-factors associated with a soil rating for plant growth. The weather sensor 80 may detect air temperature, ground temperature, hours of sunlight, precipitation per unit of time, and other weather and climatic information. The crop management sensors 75 can be associated with various agricultural equipment and are operable to provide measurement data for one or more of the following crop management parameters: planting rate, fertility, planting date, plant spacing, row width, and other miscellaneous crop management parameters.

The output device 35 can include any one of the following: an output interface 100 such as a computer terminal, a display screen 105, a printer 110, or any other output source capable of displaying an output data to the user.

Having described the general construction of the system 20 in accordance with the present invention, the following is a general description of a method 120 of managing a crop stand in accordance with the present invention. The method 120 of the invention is represented by software program code or instructions stored in the program memory 60 and configured to be accessed for execution by the processor 50.

Step 125 is the start of the method 120. Step 130 includes accessing the system 20 via the input 30 or directly at the system 20 so as to enter identification information for a user utilizing the system 20. The identification information includes one or more of the following: a name, a zip code, a field name, and other identification information data. Step 135 further includes entering crop plant data via the input 30 for transmission via the communication link 40 to the controller 25. The exemplary crop plant data includes one or more of the following: a planting date, a date of sampling of the crop plants, a type of crop plant, an approximate maturity of the crop plant, a type of seedbed tillage or preparation, a brand of seed product, an indication of seed insecticide herbicide or insecticide treatment, a count of seed product per bag or other unit, a weight per bag or other unit, and other crop plant information data.

Figure 2:
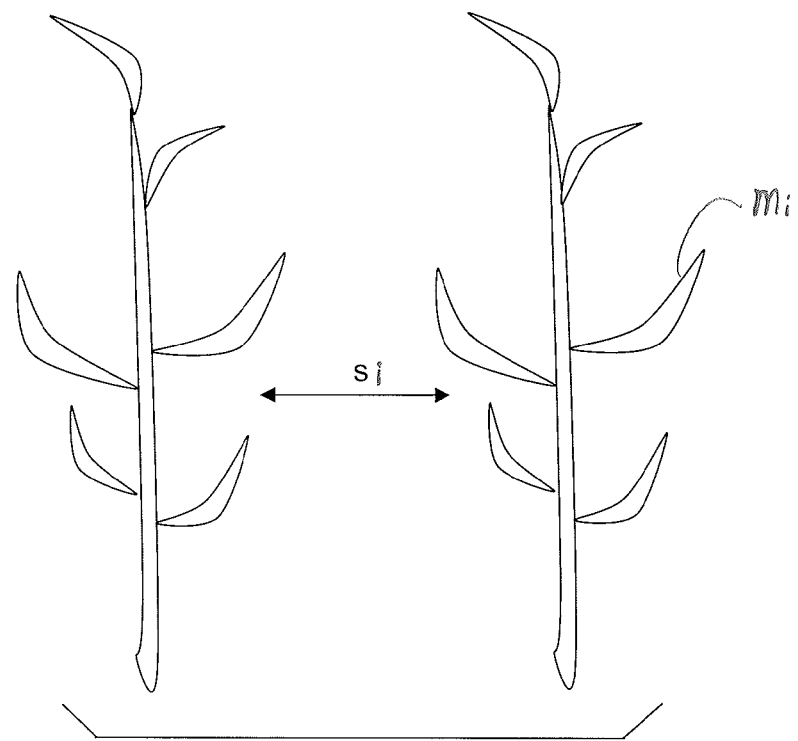
FIG. 2 illustrates a schematic diagram of a plant spacing that is utilized as a management parameter to determine the potential yield of an individual plant.
Figure 3:
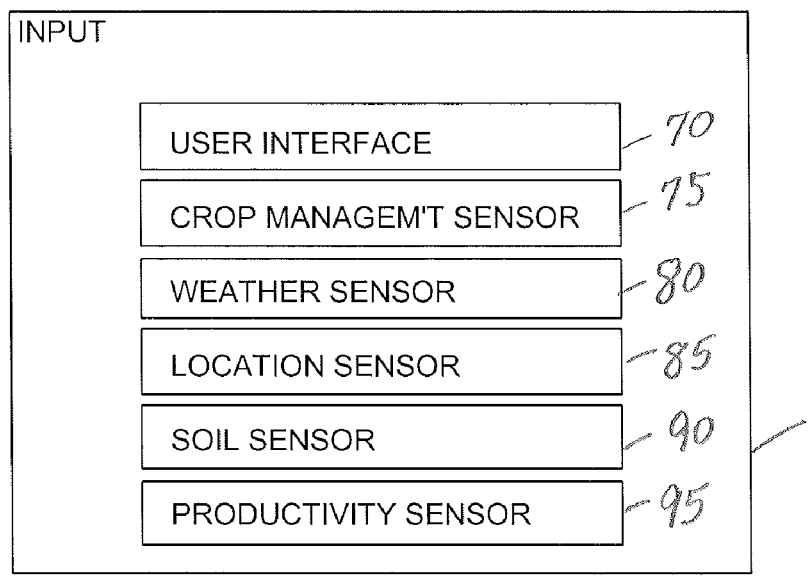
FIG. 3 illustrates a detailed schematic diagram of the input shown in FIG. 1.

The crop sampling data includes measuring indicia that are indicative of a crop plant stand quality and potential yield loss. In one embodiment of the method 120 of the invention, the collection of sampling data can include counting plants in a predetermined sub area in a field planted with the crop. In the sampling sub-area or length, the sampler counts a number of individual plants and individual spacing ($s_i$) and plant maturity ($m_i$) in a selected sampling row length relative to neighboring plants in the row (See FIG. 2). Experiments have shown that plants that are not properly spaced, relative to neighboring plants in the row, do not yield to their full potential. If the spacing of a plant is a standard deviation within a predetermined benchmark spacing, the plant is forced to compete with neighboring plants for sunlight, moisture and nutrients. For example, results in regard to corn plant stands have shown that a standard deviation in plant spacing greater than three inches generally limits yield potential above the acceptable benchmark for the crop plant. It should be understood that the standard deviation for plant spacing in regard to predicted effect on yield potential can vary depending on type of plant (e.g., corn, beets, etc.), geographical conditions, and other miscellaneous factors.

The sampling data also collects information on a maturity ($m_i$) of the plants in comparison to other adjacent in-row plants relative to their growth rate. One example of measuring a maturity of a plant includes measurement of a number of leaves or plants that are started relative to adjacent neighboring plants in row. Plants that are behind in growth stage are once again forced to compete with larger more developed plants for sunlight, moisture, and nutrients. Of course, other measurements of a maturity ($m_i$) can include a height, number of flowers, etc., and other known parameters of maturity related to crops. Also, measurements of maturity related to animals can include weight, height, etc., and other known parameters related to maturity.

The controller 25 receives the input data. At step 140, the controller 25 includes a program memory 60 storing a software program configured to evaluate the input data relative to third party or benchmark data, including a coefficient representative of predicted yield of an individual plant relative to benchmark data for individual plants.

One embodiment of calculating a predicted yield or productivity of an individual plant includes utilizing a mathematical model to calculate a net effective crop stand. Plants that are not spaced apart ($s_i$) properly in-row do not yield to their full potential. When a deviation from a benchmark plant spacing is not acceptable, plants are forced to compete with each other for sunlight, moisture, and nutrients. Plants that are identified or classified as side-by-side based in spacing ($s_i$) within these standard deviations of a benchmark spacing are categorized as "doubles" or "triples" to predict yield loss. A "double" includes two plants that within a predetermined threshold spacing of one another, and a "triple" includes three or more plants that are within the predetermined threshold spacing of one another. In the exemplary mathematical model, plants that are classified as doubles are discounted by 50% from the benchmark yield potential of an individual plant. Plants that are classified as triples are discounted by 66% from the benchmark yield potential of an individual plant. In other words, two plants that are identified or classified as side-by-side based on their spacing are given the yield potential of one plant, and three plants that are classified as side-by-side based on their spacing are given the yield potential of one plant.

The step 140 of calculating a predicted productivity is further based on the measured maturity ($m_i$) of a plant relative to neighboring plants. Plants that do not emerge uniformly with neighboring plants, often referred to as late emergers, do not yield to their full potential. When plants emerge behind neighboring plants, they can never physiologically catch up. A certain number of growing degree days are required for plants to produce new leaves. Plants that emerge late cannot produce leaves any faster than plants that emerge early. Plants that are behind in growth stage are once again forced to compete with larger more developed neighboring plants for sunlight, moisture, and nutrients.

In accordance with exemplary mathematical model, plants that are one to two leaves behind are discounted in by 50%, and plants that are 3 or more leaves behind neighboring plants are discounted by 100%. In other words, two plants that are 1-2 leaves behind are given half of the yield potential value of one plant, and plants that are 3 or more leaves behind are not given any credit for yield potential.

Continuing with our specific example described above, utilizing the mathematical model includes determining a target or benchmark plant population for the farmland or defined geographic area of interest. A user counts 34 plants in a 17'5" sampling length on a field planted in 30" rows. Based on the input data for at least one of a type of planter, a row spacing, and the number of plants counted in the sampling area, the system 20 calculates a total plant count equal to about 34,000 total plant population per acre. The total plant count or population per acre is used as a target or benchmark plant population.

The mathematical model for the net effective plant population per acre represents the benchmark plant population per acre reduced by third party information for the discount factors based on the input data for the various management parameters described above. For example, assume the input data indicates there are two "doubles" counted in the sampling length. The system 20 estimates this input data based on the spacing ($s_i$) to predict a total number of "doubles" to be 2,000 plants per acre. The mathematical model deducts or subtracts 50% of the estimated 2,000 doublets per acre, for a deduction of 1,000 plants, from the total 37,000 benchmark plant population per acre. The calculated result is a net effective plant stand equal to 36,000 plant population per acre. If one set of "triples" is identified in that same sampling length, the mathematical model deducts 100% of the estimated number of triples per acre, which equates to a another deduction of 2,000 plants per acre, from the net effective plant stand of 36,000 plants per acre. If a user counts two plants within that same sampling length that are 1-2 leaves behind relative to a neighboring plant or benchmark plant, the mathematical model deducts another 1,000 plants per acre from the net effective plant stand. If a user also counts one plant in that same sampling length that is three or more leaves behind the benchmark plant or neighboring plant, the mathematical model deducts another 1,000 plants per acre from the net effective stand. Based on the total resulting deductions for the discount factors described above related to the noted plant management parameters, the resulting net effective plant stand would equal 29,000 plants per acre, compared to the benchmark or target 37,000 plant population per acre.

Another embodiment of the mathematical model to calculate the net effective stand includes calculation of a percentage of the benchmark plant stand or plant population using the above-described discount factors and the input data for the plant stand management parameters noted above. This embodiment of the mathematical model to calculate the net effective stand is expressed as the following representation:

$$\text{Net Effective Plant Pop.} = [(TP_i - \Sigma(n_{si} * s_i + n_{mi} * m_i))/TP_i] * (\text{Benchmark Plant Pop.})$$

where (i) represents an identifier of the sampling sub-area, ($TP_i$) represents a total number of plants in the sampling sub-area, ($n_{si}$) represents number of plants in sampling within a predetermined threshold spacing relative to the nearest neighboring plant that differs from a benchmark spacing, ($s_i$) represents a predicted deduction or discount factor dependent on spacing, ($n_{mi}$) represents number of plants in the sampling sub-area within a predetermined threshold maturity that differs relative to a benchmark maturity, and ($m_i$) represents a predicted deduction or discount factor dependent on the maturity.

For example, assume that a total measured population of plants ($TP_i$) in a designated sampling row equals 32 plants. If two plants are identified in the sampling length to be 1-2 leaves behind a benchmark or neighboring plant, a maturity discount factor ($m_i$) of (−0.5) is multiplied by the number of plants ($n_{si}$), which equals a net effective value of (−1). If one plant is identified in the sampling length that is three or more leaves behind a benchmark or neighboring plant, a maturity discount factor ($m_i$) of (−1) is multiplied by the number of plants ($n_{mi}$), which equals a net effective value of (−1). If two "doubles" as described above are identified in a sampling row, a spacing discount factor ($s_i$) of (−0.5) is multiplied by the number of doubles ($n_{mi}$) to result in a net effective value of (−1). If three triples as described above are detected in the sampling length, a spacing discount factor ($s_i$) of (−0.67) is multiplied by the number of triples ($n_{si}$) to result in a net effective value of (−2). The total result of the net effective stand would be 32 minus the sum of the net effective values (−5) to equal a net effective effective 27, which is a net effective deduction of 84% from the measured number of 32 plants. The 84% net effective deduction is then multiplied by the benchmark or target total plant population per acre to calculate the net effective population or stand per acre.

Once the net effective stand is determined, step 145 includes calculating a predicted yield. The net effective plant population is multiplied by a benchmark average yield per plant (e.g., weight) to determine a predicted yield potential on a per acre basis. For example, with corn, the benchmark yield includes the average grain weight per ear multiplied by the benchmark ears per plant. The average yield weight per plant is relative to the maturity rating of a particular hybrid. It should be understood that this data as provided by seed companies can vary depending on the hybrid rating, geography, and other miscellaneous factors. For example, an average grain weight per ear of a 105 day hybrid corn is 0.37 pounds per ear, while an average grain weight per ear for a 115 day hybrid corn is 0.4 pounds per ear. A benchmark yield per acre equals the benchmark plant population per acre multiplied by the benchmark yield per plant. The difference between the benchmark yield per acre and the predicted yield per acre equates to the predicted yield loss per acre.

Step 150 includes calculating and displaying a predicted financial loss based on third party information of crop market price received via the input 30 and/or stored in the memory 55 of the controller 25. The predicted yield loss multiplied by the crop market price equates to the predicted financial loss based on the input data for the management parameters. The step 155 includes identifying and displaying recommendations based on deviations in the input data and benchmarks for the crop management parameters. Step 160 includes calculating and displaying a predicted increase in yield per acre and return on investment associated with implementing one or more the identified recommendations for one or more of the following parameters: market price data, third party information of equipment costs, plant spacing, plant maturity, and planting date.

For example, a grower may want to evaluate the predicted return on investment associated with using a new planter equipment. The system 20 would receive third party information or already have stored sampling data (e.g., historical spacing data including number of "doubles" and "triples" counted in a plant stand and a count of differentiating maturity of plant stand) associated with using the new planting equipment, and the capital cost of the new planting equipment. Using the predicted benchmark yielded potential of the plant and predicted benchmark plant population, the system 20 can calculate a predicted return on investment dependent on the costs and the predicted increase in yield per acre utilizing the new planting equipment, and display the return in investment to the grower.

Accordingly, the system 20 and method 120 of the invention described above provides a simple and reliable evaluation tool to growers in understanding how seed performance and planter performance work together in affecting the grower's plant stand quality and profit. The system 20 and method 120 also provides the grower with recommendations for opportunities to improve the plant stand quality and profit, and means to evaluate a return on investment for implementation of one or more of the recommendations in plant stand management. The system 20 and method 120 are also operable to adjust or modify the miscellaneous benchmark data and deduction factors based on third party or user information. Specifically, the system 20 can receive input data of actual measured yield data of individual plants at a measured spacing and a measured maturity relative to a type of planter used, and subsequently provide predicted yield of plant population based on the type of planter used the historical spacing, maturity, and yield data stored in the memory 55 of the system 20.

Although the above description includes examples of using the plant stand management system with a crop of corn, the invention is not so limited. The system of the invention can be applied to any type of seed (e.g., soy beans, beats, etc.) and is not limiting on the invention. Also, the system 20 is configured to update data (e.g., benchmark yield potential, benchmark spacing, benchmark maturity, predicted deduction factors in yield potential, etc.) as updated by third parties (e.g., seed companies) for various types of plants and hybrids going forward.

Moreover, the system of the invention is not limited to predicted yield potential of a plant. The system of the invention can also be easily applied to a calculate a predicted net effective population and associated predicted yield of poultry, cattle, or other agricultural commodity dependent on deduction factors from a benchmark for various management parameters. For example, a mathematical model with the objective function to predict a net effective animal population could be represented as:

$$\text{Net Effective Animal Pop.} = [(TP_i - \Sigma(n_{si} * s_i + n_{mi} * m_i))/TP_i] * (\text{Benchmark Animal Pop.})$$

where (i) represents an identifier of the sample population, ($TP_i$) represents a total population of animals in the sample population, ($n_{si}$) represents number of animals in the sample population within a predetermined size differing from a benchmark size, ($s_i$) represents a predicted deduction or discount factor dependent on the size, ($n_{mi}$) represents number of animals in the sample population within a predetermined maturity differing from a benchmark maturity, and ($m_i$) represents a predicted deduction factor dependent on the maturity. It should be apparent to one skilled in the art that other management parameters and respective deduction factors can be added to the mathematical model and is not limiting on the invention.

Many changes and modifications could be made to the invention without departing from the spirit thereof. The scope of these changes will become apparent from the appended claims.

We claim:

1. A plant stand management evaluator system in communication with a remote user terminal via a communications network, the system comprising:
   a computer including a processor in communication with a memory, the memory including a plurality of computer program code instructions for execution by the processor, the plurality of computer program code instructions including the steps of:
      receiving input data from a user, the input data representative of at least parameter 1) and parameter 2) of management parameters in the group consisting of:
         1) a total plant population in a selected sampling sub-area,
         2) a spacing of an individual plant relative to a nearest adjacent plant in the sampling sub-area, the majority of plants spaced-apart for optimal yield potential via a benchmark spacing for each plant in the sampling sub-area, a minority of plants spaced too closely relative to the benchmark spacing within the sampling sub-area such that two or more too closely spaced plants within the sampling sub-area result in a 50 percent or greater loss in yield potential per too closely spaced plant, and
         3) a maturity of the individual plant relative to the nearest adjacent plant in the sampling sub-area;
      calculating a predicted net effective plant population according to the expression:

$$\text{NEPP} = [(TP_i - \Sigma(n_{si} * s_i + n_{mi} * m_i))/TP_i] * (\text{BPP})$$

wherein:
         NEPP is the predicted net effective plant population;
         (i) represents an identifier of the sampling sub-area, where the ($TP_i$) represents the total number of plants in the sampling sub-area, ($n_{si}$) represents a number of plants in sampling having a spacing relative to the nearest neighboring plant that differs from the benchmark spacing, ($s_i$) represents a predicted deduction factor in yield dependent on spacing, ($n_{mi}$) represents number of plants in the sampling sub-area within a predetermined maturity below a benchmark maturity, ($m_i$) represents a predicted deduction factor in yield dependent on maturity; and BPP is a benchmark plant population; and
      generating a display indicative of the predicted net effective plant population to the user.

2. The system as recited in claim 1, the plurality of computer program code instructions further including the steps of:
   calculating a predicted yield of the plant population equal to the predicted net effective plant population multiplied by a benchmark yield per plant; and
   displaying the predicted yield to the user.

3. The system as recited in claim 2, the plurality of computer program code instructions further including the steps of:
   calculating a predicted yield loss dependent on a difference between the predicted yield of the plant population and a benchmark yield of the plant population, the benchmark yield of the plant population equal to the benchmark plant population multiplied by the benchmark yield per plant; and
   displaying the predicted yield loss to the user.

4. The system as recited in claim 3, the plurality of computer program code instructions further including the steps of:
   receiving a crop market price data per yield; and
   calculating a predicted cost in yield loss equal to the predicted yield loss multiplied by the crop market price data per yield.

5. The system as recited in claim 4, the plurality of computer program code instructions further including the step of:
   identifying a recommendation to reduce the predicted yield loss.

6. The system as recited in claim 5, wherein the identifying a recommendation step includes:
   identifying differences between the input data for benchmark maturity and a benchmark maturity of an individual plant relative to neighboring plants;
   calculating a predicted increase in profit dependent on a difference between a price of a benchmark yield dependent on the benchmark maturity and the price of the predicted yield; and
   displaying the increase in profit to the user.

7. The system as recited in claim 5, wherein the identifying a recommendation step includes:
   identifying differences between the spacing of the individual plants and a benchmark spacing for the individual plant;
   calculating a predicted profit based on a difference in the price of the predicted yield and a price of the benchmark yield at the benchmark spacing; and
   displaying the recommendation including the benchmark spacing and the predicted profit to the user.

8. The system as recited in claim 4, the plurality of computer program code instructions further including the step of calculating a return on investment for a planting equipment, including:
   receiving a input data representative of at least one of a historical spacing of individual plants relative to the benchmark spacing using the planting equipment, and a historical maturity of individual plants relative to the benchmark maturity using the planting equipment;
   receiving a capital cost of the planting equipment;

calculating a net effective plant population using the mathematical model and the input data for at least one of the historical spacing and the historical maturity;

calculating a predicted yield of the plant population and a predicted increase in profit using the predicted net effective plant population;

calculating the predicted return on investment dependent on the capital cost of the planting equipment and the predicted increase in profit using the planting equipment; and displaying the predicted return in investment to the grower.

9. The system as recited in claim 1, wherein the maturity deduction factor ($m_i$) for the number of plants that are one to two leaves behind a benchmark number of leaves is (−0.5), and wherein the deduction factor ($m_i$) for a number of plants that are three or more leaves behind the benchmark number of leaves is (−1).

10. The system as recited in claim 1, wherein the spacing deduction factor ($s_i$) for two too closely spaced plants is (−0.5), and wherein the spacing deduction factor ($s_i$) for three or more too closely spaced plants is (−0.67).

* * * * *